United States Patent [19]

Leon et al.

[11] Patent Number: 5,432,436
[45] Date of Patent: Jul. 11, 1995

[54] METHOD FOR REMOTELY APPROXIMATING THE STEM THURST OF MOTOR OPERATED VALVES

[75] Inventors: Robert L. Leon, Maple Glen; Martin J. Dowling, Norristown, both of Pa.; Craig C. Nagler, Cherry Hill, N.J.; Glenn D. Weiss, Fleetwood, Pa.

[73] Assignee: Liberty Technologies, Inc., Conshohocken, Pa.

[21] Appl. No.: 255,515

[22] Filed: Jun. 8, 1994

Related U.S. Application Data

[63] Continuation-in-part of Ser. No. 161,833, Dec. 3, 1993, which is a continuation-in-part of Ser. No. 71,421, Jun. 3, 1993.

[51] Int. Cl.⁶ .............................. G01M 19/00
[52] U.S. Cl. .................. 324/73.1; 324/772; 73/168; 73/862.191; 318/490
[58] Field of Search ................ 324/772, 73.1; 73/862.191, 862.23, 862.24, 168; 318/490

[56] References Cited

U.S. PATENT DOCUMENTS

| | | | |
|---|---|---|---|
| 4,542,649 | 9/1985 | Charbonneau et al. | 73/168 |
| 4,690,003 | 9/1987 | McNennamy et al. | 73/168 |
| 4,735,101 | 4/1988 | Charbonneau | 73/168 |
| 4,805,451 | 2/1989 | Leon | 73/168 |
| 4,831,873 | 5/1989 | Charbonneau et al. | 73/168 |
| 4,869,102 | 9/1989 | Hale et al. | 73/168 |
| 4,888,996 | 12/1989 | Rak et al. | 73/862.19 |
| 4,891,975 | 1/1990 | Charbonneau et al. | 73/168 |
| 4,896,101 | 1/1990 | Cobb | 324/73.1 |
| 4,987,358 | 1/1991 | Branam | 318/603 |
| 5,000,040 | 3/1991 | Charbonneau et al. | 73/168 |
| 5,029,597 | 7/1991 | Leon | 73/168 |
| 5,239,874 | 8/1993 | Hale | 73/862.191 |

FOREIGN PATENT DOCUMENTS

WO8704244 7/1987 WIPO.

*Primary Examiner*—Kenneth A. Weider
*Assistant Examiner*—Mark Wardas
*Attorney, Agent, or Firm*—Panitch Schwarze Jacobs & Nadel

[57] ABSTRACT

A method is disclosed for approximating the stem thrust during the operation of a motor operated valve combination including a valve having a valve stem, a valve disk, a valve seat, and a motor operator having a motor drive means interconnecting the motor to the valve stem for movement of the valve stem disk toward and into engagement with the valve seat to close the valve and a control switch for deactivating the motor. The method comprises the steps of sensing the stem thrust of the motor operated valve combination as a function of time during valve closing at a first time and establishing a thrust trace; sensing the real electrical power of the motor as a function of time during valve closing at a second time which is subsequent to the first time and establishing a power trace; relating corresponding points of the thrust trace and the power trace starting at a point on each trace corresponding to the onset of wedging of the valve disk and extending to a point of the power trace at which the control switch deactivates the motor; determining from the power trace the value of the power at the zero thrust point; determining a best fit analytical function that takes into account the zero thrust power point and the changing thrust vs change in power relationship described by the corresponding time points of the two traces from the onset of wedging to deactivation of the motor by the control switch; and approximating from the best fit analytical function a thrust value associated with a point on the power trace at the second time.

7 Claims, 4 Drawing Sheets

METHOD FOR REMOTELY APPROXIMATING THE STEM THURST OF MOTOR OPERATED VALVES

This is a continuation-in-part of co-pending U.S. patent application Ser. No. 08/161,833, filed Dec. 3, 1993, entitled "A Method For Remotely Approximating The Stem Thrust Of Motor Operated Valves", which is a continuation-in-part of co-pending U.S. patent application Ser. No. 08/071,421, filed Jun. 3, 1993, entitled "A Method For Remotely Determining Operability Of Motor Operated Valves".

FIELD OF THE INVENTION

The present invention relates generally to motor operated valve combinations and, more particularly, to a more universally applicable method for approximating from a remote electrical power measurement and the results of a previous thrust measurement, the absolute stem thrust during the operation of the motor operated valve combination.

BACKGROUND OF THE INVENTION

Motor operated valve combinations or valves are commonly used in nuclear and other power plants to perform routine opening and closing of water and steam lines and, more importantly, for those valves designated as safety related, to perform such openings or closings to assure prompt, safe shutdown of the plant under accident or other emergency or abnormal operating conditions. For those valves of this class whose safety function is to close a water, steam or other line, it is important that the valve achieve full or complete closure when called upon to do so. Most motor operated valves in use today are controlled by a torque switch which shuts off or stops the operation of the operator motor when a predetermined valve actuator torque limit is reached and a spring pack or other component moves in response to actuator torque to trip or actuate the torque switch. Since the torque switch displacement is approximately proportional to the actuator torque above some preload torque, and since the actuator torque is approximately proportional to the stem thrust, the torque switch displacement set point can be and generally is used to turn off the motor at approximately a value sufficient to fully close the valve and provide some additional margin to both help insure against leakage and account for possible degradations and non repeatabilities that could reduce that margin.

A certain amount of stem thrust is required for a motor operated valve (MOV) to close against differential pressure. The required thrust can be calculated as the sum of the packing friction force, the stem rejection force, and the differential pressure force. The packing friction force is the force required to push the valve stem through the packing which has been compressed against the stem to prevent leakage. The stem rejection force is the force of the internal pressure trying to spit out the valve stem. It is equal to the internal line pressure times the cross sectional area of the stem. The differential pressure force is the friction force opposing the inward movement of the valve disk as it is pushed in by the valve stem to close off the opening of the valve. It is equal to the differential pressure across the valve times the effective area of the valve disk against the downstream seat, this coefficient of friction is often referred to as the valve factor. The valve factor is the least predictable, and possibly least constant factor for required thrust.

A control switch, typically the torque switch, is adjusted to trip and thereby turn off the operator motor at a stem thrust level which is generally higher than the computed required closure thrust so as to provide a comfortable margin to account for unpredictable or changeable factors such as the valve factor in the required thrust, and such as stem lubrication degradation which can reduce the achieved thrust for the given amount of achieved torque. Typically a thrust verification test is run at the valve to determine the actual thrust applied to the valve stem at control switch trip (CST), usually torque switch trip, making sure the actual thrust exceeds the computed required closure thrust by a comfortable margin. The at-the-valve test is repeated periodically to insure that degradations such as lubrication degradation have not significantly reduced the level of thrust being developed at CST. Lubrication degradation increases the friction between the threads of the valve stem and the threads of the stem nut that drives the valve stem. This increased friction is what causes lower thrust for the given amount of torque.

Co-pending Parent U.S. patent application Ser. No. 08/071,421, filed Jun. 3, 1993, describes a method for remotely quantifying lubrication degradation so that during times when plant maintenance personnel cannot be at the valve during plant operation (common in nuclear power plants), proper lubrication may be remotely verified, and if improper lubrication should be detected, operations may be halted so that the necessary relubrication can take place. The parent patent application also describes a remote means for approximating thrust differences above or after the onset of wedging including the reverification of thrust margins, defined there as the difference between the thrust at the onset of wedging and thrust at CST. Valuable as such knowledge is, the methodology described in the parent application does not address how to remotely approximate thrust differences below as well as above the onset of wedging, nor how to approximate absolute values of thrust both below and above the onset of wedging. The methods to accomplish these results are the subject of the present invention.

The parent patent application (Ser. No. 08/071,421) recognizes and makes use of the fact that the time rate of thrust buildup after the onset of wedging remains constant independent of lubrication degradation. Co-pending parent patent application Ser. No. 08/161,833 made use of that fact as well as the fact that as the motor operated valve actuates, the ratio of change in thrust to change in power remains constant before and after the onset of wedging for a given lubrication condition, a fact which, while true for many valves, is not true for all valves. The present invention allows the relationship between the change in thrust and the change in power to not remain constant before and after the onset of wedging for a given lubrication condition as the motor operated valve actuates, a condition present in about half of all such valves.

SUMMARY OF THE INVENTION

Briefly stated, the present invention comprises a method for approximating the stem thrust during the operation of a motor operated valve combination. The motor operated valve combination includes a valve having a valve stem, a valve disk, a valve seat, and a motor operator having a motor drive means interconnecting the motor to the valve stem for movement of the valve disk toward and into engagement with the valve seat to close the valve, and a control switch for deactivating the motor. The method comprises the steps of sensing the stem thrust of the motor operated valve combination as a function of time during valve closing at a first time and establishing a thrust trace. The real electrical power of the motor is sensed as a function of time during valve closing at a second time, subsequent to the first time, and a power trace is established. Corresponding time periods of the thrust trace and the power trace are related to each other starting at a point on each trace corresponding to the onset of wedging of the valve disk and extending to a point of the power trace at which the control switch deactivates the motor. The power at the zero thrust point is determined from the power trace and a best fit analytical function is determined that takes into account the zero thrust power point and the change in thrust verses change in power relationship described by the corresponding points of the two traces during the period from the onset of wedging to the activation of the motor by the control switch. Thereafter, a thrust value associated with a point on the power trace at the second time is approximated from the best fit analytical function.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangements and instrumentalities shown. In the drawings.

DETAILED DESCRIPTION OF PREFERRED EMBODIMENT

Figure 1:
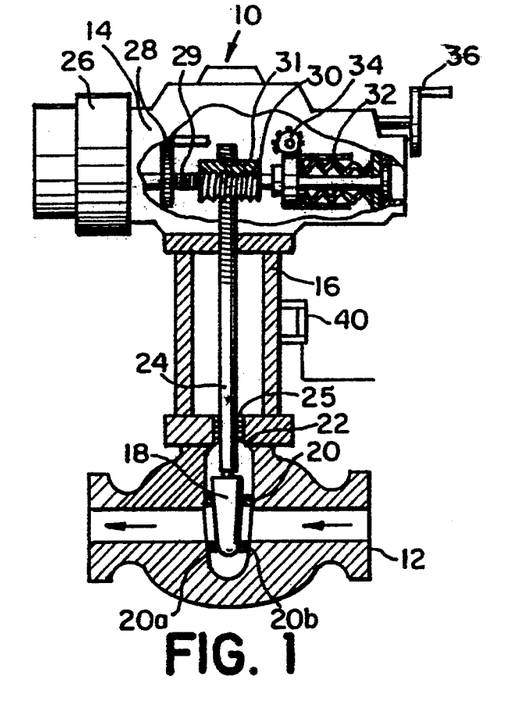
FIG. 1 is an elevation view of a motor operated gate valve shown partially in section and partially broken away, with a preferred embodiment of a yoke mounted thrust sensor for measuring the valve stem thrust as the motor operated valve is stroked in accordance with the present invention.

Referring now in detail to the drawings, in which like numerals indicate like elements throughout, there is shown in FIG. 1, an elevation view, partially broken away and partially in section, of a motor operated gate valve combination or valve 10. The motor operated gate valve 10 is a type which is generally well known in the art and is commercially available from a variety of sources. The motor operated gate valve 10 includes a valve member 12 and a valve operator 14 which are connected together by a valve yoke 16. The valve member or valve 12 includes a movable valve member or disk 18, a fixed valve seat 20 including a downstream seat ring 20a and an upstream seat ring 20b, and a fixed valve backseat 22. The valve disk 18 is movable between a "seated" position (not shown) in which it fully and firmly engages the entire valve seat 20 thereby fully closing the valve 12 and a "backseated" position (not shown) in which it engages the valve backseat 22 thereby fully opening the valve 12. As shown in FIG. 1, the valve disk 18 is in an intermediate position part way between the seated and backseated positions but closer to the seated position.

The valve disk 18 moves between the seated and backseated positions by the action of a valve stem 24, one end of which is secured to the valve disk 18. The valve stem 24 extends through suitable openings in the valve 12 and valve yoke 16 with the other end extending into the valve operator 14 as shown. Where the valve stem 24 extends through the valve 12, it is sealed against leakage by packing material 25.

The valve operator 14 contains a motor 26, in the present embodiment an electric motor, which in the present embodiment is shown as being a three phase A.C. motor. The output shaft of the motor 26 is connected through suitable reduction gears 28 to a splined worm shaft 29 whose splines force a worm 30 that surrounds it to rotate with it, and the worm 30 in turn drives a worm gear 31. The worm gear 31 surrounds and is drivingly engaged with a drive sleeve and stem nut (not shown). The stem nut threadingly engages Acme type threading on the upper end of the valve stem 24. Since the stem nut is restrained from axial movement and the valve stem 24 is restrained from rotating, rotation of the stem nut results in axial movement of the valve stem 24. The direction of movement of the value stem 24 (up or down) depends upon the direction of movement of the output shaft of the motor 26 and the corresponding direction of rotation of the stem nut. Of course, the axial movement of the valve stem 24 results in corresponding movement of the value disk 18 to open or close the valve 12. During the valve opening or closing operation, both thrust and torque exist between the valve stem 24 and the stem nut as a result of the Acme threads. As the valve disk 18 engages the valve seat 20 the compressive stem thrust increases, generating a reaction torque on the stem nut, drive sleeve and worm gear 31 which shows up as an axial force on the worm 30.

The worm 30 which can move axially along the splines of the worm shaft 29 is connected at its distal (rightmost) end to a spring pack 32 which allows the worm 30 to move proportional to the reaction torque, the proportionality factor determined by the stiffness of the spring pack 32. A separate small gear 34 is also connected to the spring pack 32. The gear 34, in turn, is connected to a torque switch (not shown) housed in a switch compartment (also not shown), along with standard limit switches (not shown). The torque switch is used for deactivating or stopping the motor 26, referred to as torque switch trip, when the gear 34 turns a selectable preset amount as a result of the displacement of the spring pack 32. Since the generated stem torque is approximately proportional to the stem thrust, the torque switch is commonly adjusted to stop the motor 26 at the stem thrust desired for proper full valve closure.

As the valve operator 14 operates to close the valve 12, it develops both closing torque and compressive thrust on the valve stem 24 through the action of the Acme threads on the valve stem 24 and stem nut. The ratio of closing torque to compressive thrust, in foot-pounds per pound, is called the stem factor and it is a function of the stem 24 and stem nut thread geometry and the lubrication or lack thereof between them. For most stem geometries lubrication degradation, as a result of lubricant squeezing out in use or as a result of the lubricant hardening with age, can result in a doubling of the stem factor which would result in a corresponding halving of the developed stem thrust at torque switch trip. Thus lubrication degradation can significantly reduce the expected thrust delivered by the operator 14, and hence there is a very real need to periodically test a motor operated valve 10 to verify proper thrust at torque switch trip. Because thrust measurements can only be made at the valve 12, periodic verification testing has been historically done "at-the-valve". Such periodic testing can create a period of uncertainty (i.e., between testings) for some very important valves, such as the valves used in containment at nuclear power plants which are inaccessible and, therefore, not available for such at-the-valve testing for up to eighteen months between refueling outages.

Additionally, it is usually difficult to test such valves with the actual required differential pressure across the valve, so a zero differential pressure test is typically conducted at-the-valve to assure that the valve operator 14 delivers sufficient closing thrust to meet, and exceed, the closing thrust calculated to fully seat the value disk 18 on the valve seat 20, fully closing the valve 12 in the expected or required differential pressure conditions.

For measuring the stem thrust, a yoke mounted force sensor 40 can be used as shown in FIG. 1 because it is difficult to measure forces from the stem directly and the same force that exists on the stem 24 also exists on the yoke 16. The sensor 40 and its calibration are described in detail in U.S. Pat. No. 4,805,451 which is incorporated herein by reference. Complete details of the structure and operation of the force sensor 40 may be obtained by reference to the cited patent particularly FIGS. 4–6 and the corresponding portions of the specification, and need not be presented herein for a complete understanding of the present invention. Suffice it to say that the force sensor 40 effectively senses (through the valve yoke 16) forces experienced by the valve stem 24 and generates electrical signals which are proportionally related to the valve stem forces, and thus changes in those electrical signals are proportional to changes in valve stem thrust during closing of the valve 12. The analog electrical signals from the force sensor 40 are suitably amplified by a signal conditioning circuit (not shown), the amplification being such as to take maximum advantage of a subsequent analog-to-digital circuit (also not shown) which converts the analog signal to a series of digital samples equally spaced in time. The digital samples are provided to a computer for storage, and subsequent display as a stem thrust trace, or stem thrust as a function of time.

It will be appreciated by those skilled in the art that while in the presently preferred embodiment, the force sensor 40 is shown and described as being mounted on the valve yoke 16, the same force sensor 40 or another force sensor (not shown) mounted on the valve yoke 16 or elsewhere could serve the function of the present invention. Thus the present invention is not limited to a particular location for the force sensor 40, nor is it limited to a particular type of force sensor 40 for developing the stem thrust trace as a function of time.

Figure 2:
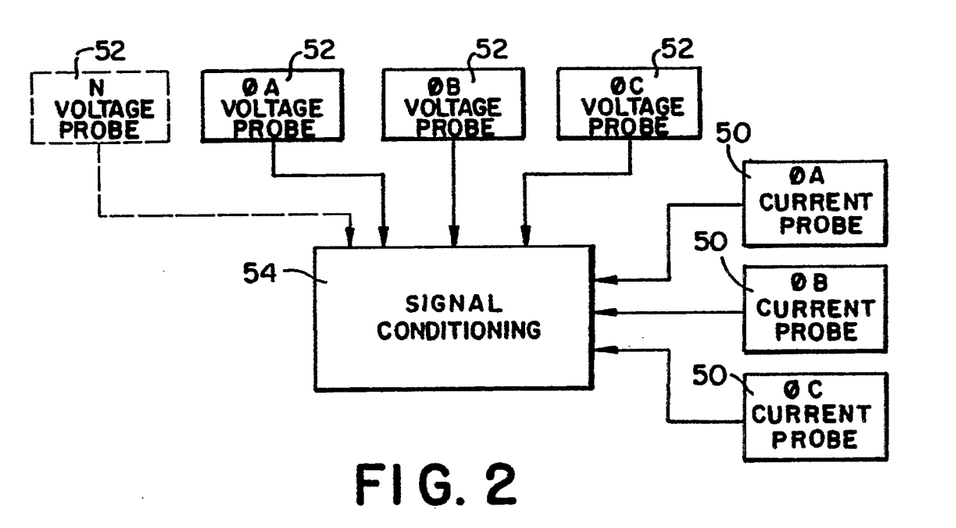
FIG. 2 is a schematic block diagram representation of a preferred embodiment of circuitry employed at a remotely located motor control center for the motor operated valve of FIG. 1 to remotely measure the motor power as the motor operated valve is stroked.

For measuring the motor power, three clamp-around Hall effect type current probes 50 of a type well known in the art, and three or four (depending on delta or wye three phase wiring configurations) clamp-on voltage probes 52, also of a type well known in the art, are utilized at the motor control center as shown functionally in FIG. 2. The current probes 50 and voltage probes 52 provide sufficient information to compute real (as opposed to apparent or reactive) motor power as a function of time. The analog electrical signals from the three current probes 50, and the three or four voltage probes 52 are suitably amplified by signal conditioning circuits 54, the various amplifications being such as to take maximum advantage of a subsequent simultaneous-sampling multi-channel analog-to-digital circuit (not shown) which converts each analog signal indicative of either instantaneous current or instantaneous voltage, to a series of digital samples equally spaced in time. The digital samples are provided to a computer (not shown) for storage and subsequent calculation of the total real (active) motor power, which then can be displayed as a real motor power trace, or real motor power as a function of time.

It will also be appreciated by those skilled in the art that in the presently preferred embodiment, the current and voltage probes 50, 52 are sufficient for the accurate computing of real motor power, but that other probe arrangements (not shown) could also provide an accurate real motor power trace and could therefore serve the function of the present invention. Thus, the present invention is not limited to a particular type or arrangement of probes or sensors for developing the real motor power trace as a function of time.

In a subsequent section of the specification, the stem torque trace as a function of time is discussed. The stem torque trace discussion is only for clarity and completeness of understanding. The stem torque trace as a function of time is not a part of this invention, and therefore no preferred embodiment for its measurement is indicated. Nevertheless a method for developing a stem torque trace is presented as follows. The stem torque sensor could be a strain gage wheatstone bridge consisting of one, two or four active strain gages bonded to the valve stem 24 with the active gage direction oriented 45 degrees to both the axis and the cross-sectional plane of the stem 24. This process is well known in the art. The analog electrical output of the strain gage bridge is suitably amplified by a signal conditioning circuit (not shown), the amplification being such as to take maximum advantage of a subsequent analog-to-digital circuit (also not shown) which converts the analog signal to a series of digital samples equally spaced in time. The digital samples are provided to a computer (also not shown) for storage, and subsequent display as a stem torque trace, or stem torque as a function of time.

Figure 3A:
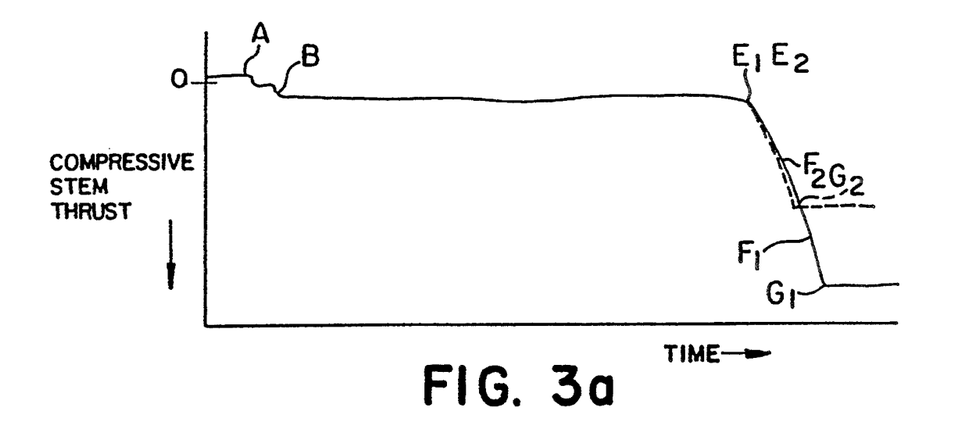
FIGS. 3a, 3b and 3c are composite graphic illustrations showing variation vs time in stem thrust, stem torque, and real motor power, respectively, during valve closure under zero differential pressure conditions, each showing the case of normal stem lubrication, and the case of significantly degraded stem lubrication, accentuating for comparison purposes both the running region before the onset of wedging and the seating region after the onset of wedging.

Typical stem thrust traces as a function of time during valve closure are shown in FIG. 3a for the closing of motor operated gate valve 10 under zero differential pressure. The solid trace (subscripts 1) of FIG. 3a is for the motor operated valve 10 with proper stem to stem nut lubrication. The dotted trace (subscripts 2) is for the same motor operated valve 10, but after significant stem to stem nut lubrication degradation. Referring to FIG. 3a, when the valve 12 first starts to close (point A), the initial stem tension due to packing force remaining from when the valve previously opened is converted into stem compression (point B) as the valve stem 4 moves into the valve 12 through the packing 25. Since there is no differential pressure forcing the valve disk 18 against the downstream seat 20a, there is no change in stem thrust until the motor operator 14 begins to wedge the valve disk 18 between the upstream and downstream seats 20a, 20b (point E). Since the motion of the valve disk 18 is substantially halted at this point, the additional valve stem thrust, termed "disk wedging force", builds up very rapidly to the toque switch trip (point F), and beyond to the maximum stem thrust (point G) because of contactor dropout time and rotary inertia. For conservative reasons, only point F, the thrust at torque switch trip, is assumed to be assured.

Figure 3B:
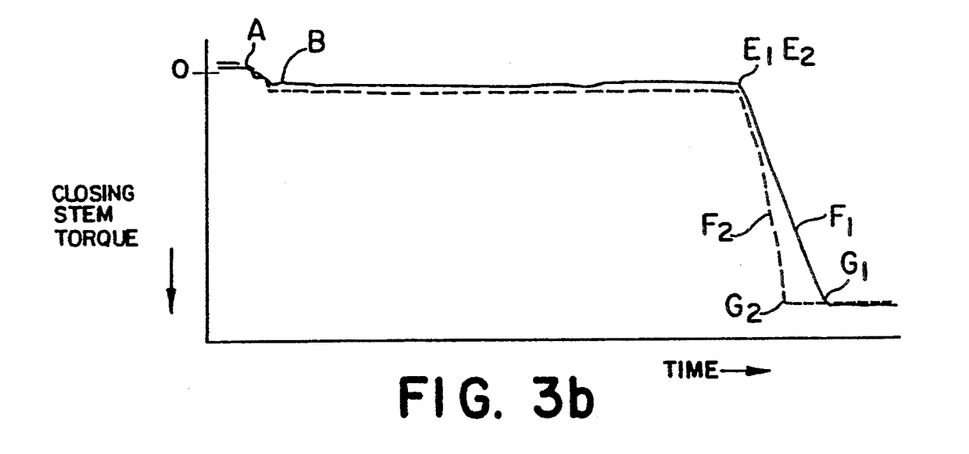
Figure 3C:
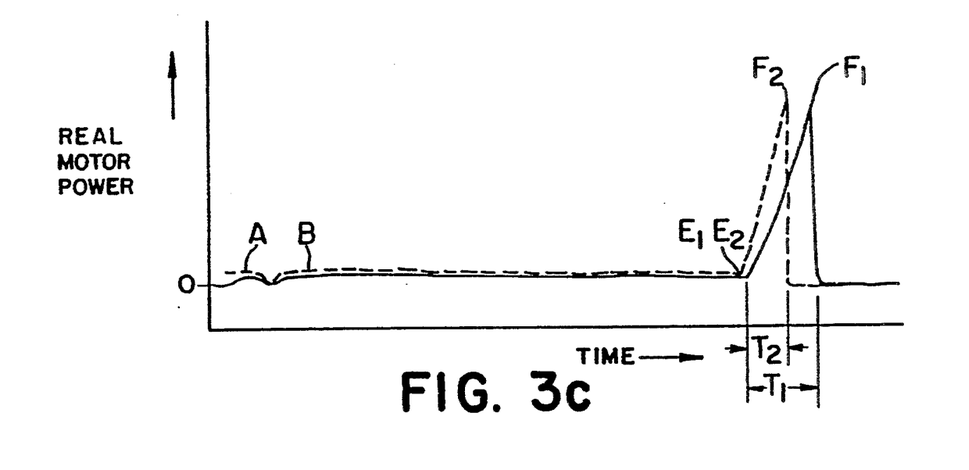

FIGS. 3b and 3c show the same two conditions for the same motor operated valve 10, except FIG. 3b shows the valve stem torque traces as a function of time and FIG. 3c shows the real motor power traces as a function of time. As in FIG. 3a, the solid trace (subscripts 1) is for the proper lubrication condition, and the dotted trace (subscripts 2) is for the lubrication degradation condition.

From FIG. 3a, the nearly halving of the stem thrust at torque switch trip (point $F_2$) due to lubrication degradation is obvious, as one might expect it would be from a stem thrust measurement. By contrast, from FIGS. 3b and 3c, the stem torque and motor power are nearly unchanged (point $F_1$ to $F_2$) at torque switch trip between the properly lubricated and lubrication degradation conditions. Tests show that stem torque and motor power at torque switch trip actually tend to change just a little bit for a very significant degradation in lubrication. As a result of the near insensitivity of stem torque and motor power at torque switch trip to lubrication degradation, one may infer that only the thrust trace, obtainable only at-the-valve, is of use in detecting and measuring the dropoff in thrust due to lubrication degradation.

But a closer look at FIG. 3a shows that, for reasons which will hereinafter become apparent, despite the very significant lubrication degradation, the time rate of thrust build-up after the onset of wedging (point E) is virtually unchanged making it possible, after only one at-the-valve test, to remotely measure thrust reductions due to lubrication degradation without having to go back to the valve. The recognition that this can be done and the methodology for accomplishing it are key components of the present invention.

With the stem 24 and stem nut properly lubricated, an at-the-valve initial or first test is run, where a trace of valve stem thrust as a function of time is determined (FIG. 3a). The test is typically run under zero differential pressure conditions (i.e., no fluid flowing through the valve 12). This is preferable, but not absolutely necessarily.

After the expiration of some period of time, some lubrication degradation may have occurred, causing a decrease or dropoff in the stem thrust at torque switch trip, and an increase in the stem factor. A second test is now run, and only the real motor power trace as a function of time (FIG. 3c) is determined, remotely, for example, at the motor control center.

The parent patent application (Ser. No. 08/071,421, filed Jun. 3, 1993) points out that the time (msec) from the onset of wedging to torque switch trip could be measured from a motor power trace obtained remotely at the motor control center (MCC), and multiplied by the previously measured but unchanging thrust rate (lbs/msec) after the onset of wedging to remotely approximate the thrust margin (lbs). Additionally, the measured time when compared to the previous time from the onset of wedging to torque switch trip could be used to quantify the degree of lubrication degradation. As the parent application also points out, if an initial motor power trace had been obtained, the ratios of the power rates (watts/msec) could also be used to estimate the degree of lubrication degradation, and this estimation would be more accurate since fewer assumptions were involved.

The present invention comprises an improved method to approximate remotely from the MCC, thrust differences before or after the onset of wedging, and absolute thrusts before or after the onset of wedging such as running thrusts, and the thrust at flow cutoff. The running thrust in a zero line pressure test is simply the packing force, and in a differential pressure test with line pressure is the packing force combined with the stem rejection force. It is important to be able to remotely monitor the running thrust value because if it gets too low it could result in undesirable valve leaks, and if it gets too high it could reduce the available thrust margin. It is even more important to be able to remotely approximate the thrust at flow cutoff so the valve factor can be effectively determined and any changes evaluated. The thrust at flow cutoff is typically less than the thrust at the onset of wedging, so the previous methodology is ineffective even in estimating the thrust difference between flow cutoff and torque switch trip. Thus there is clearly a need for the present invention. The following presents the technical facts and logical reasoning behind the methodology.

Figure 4A:
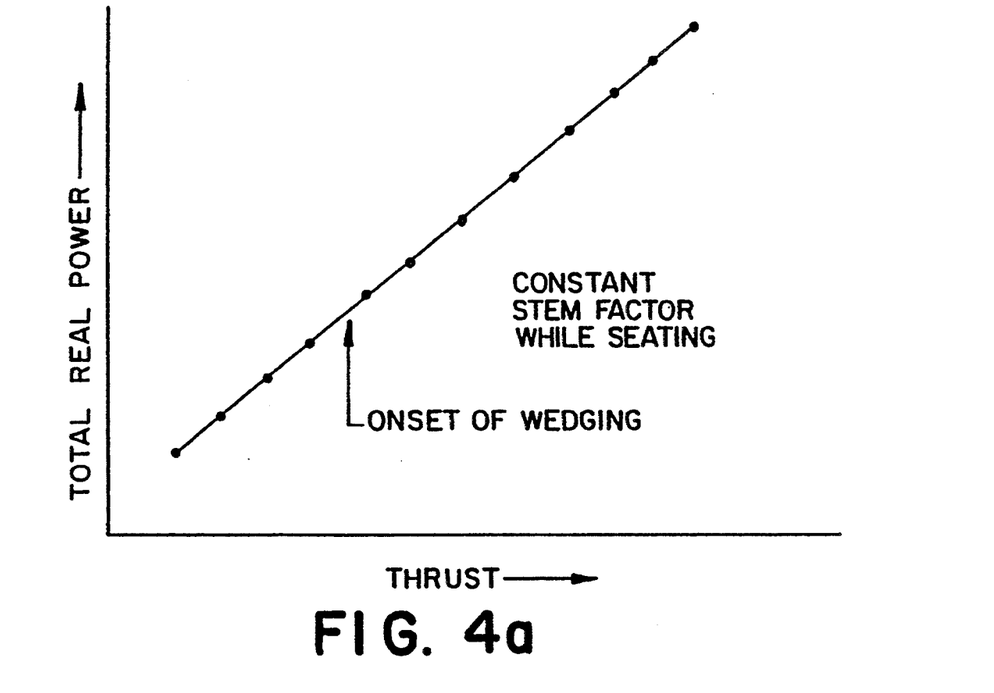
FIGS. 4a and 4b are composite graphic illustrations showing total real power vs thrust from the onset of wedging through seating with a constant stem factor and a non-constant stem factor, respectively.

For about half of the installed motor operated valves in nuclear power plants, if one were to plot from the same test (same valve closing stroke), the corresponding time points from FIGS. 3a and 3c on a graph of thrust (lbs) vs total real motor power (watts) as in FIG. 4a, one would see that the points before the onset of wedging and the points after the onset of wedging would lie essentially along the same straight line for a given lubrication condition. If subsequently however, the stem lubrication were to degrade, and the test were rerun, one would find that the points before and after the onset of wedging still lie along a straight line but the slope of the line (lbs/watt) will have changed. This is why a previously determined slope cannot be used to accurately determine thrust from measured power when there is the possibility of lubrication degradation. Only the power rate (watts/msec) after the onset of wedging changes to take into account any lubrication degradation, with the thrust rate (lbs/msec) after the onset of wedging tending to remain constant. Thus a prior (possibly years earlier) thrust rate measured on the thrust trace sometime after the onset of wedging, can be used in conjunction with a subsequent power rate measured on the power trace sometime after the onset of wedging, to approximate the thrust both before and after the onset of wedging, using the difference in power from the power at zero thrust in that subsequent condition. This is the essence of co-pending parent patent application Ser. No. 08/161,833.

Those valves that can benefit from the procedure described in parent patent application Ser. No. 08/161,833 do so because they tend to exhibit a straight line relationship in a plot of thrust vs total real power. In not unrelated fashion, such valves also tend to exhibit constant stem factors, or torque to thrust ratios, while seating. One may presume from this that such valves have well aligned and smooth thread mating surfaces between their stems and their stemnuts. As the thrust increases during seating, no metal to metal contact apparently occurs in such valves to increase the friction and cause their stem factor to increase as lubricant is squeezed thinner.

Figure 4B:
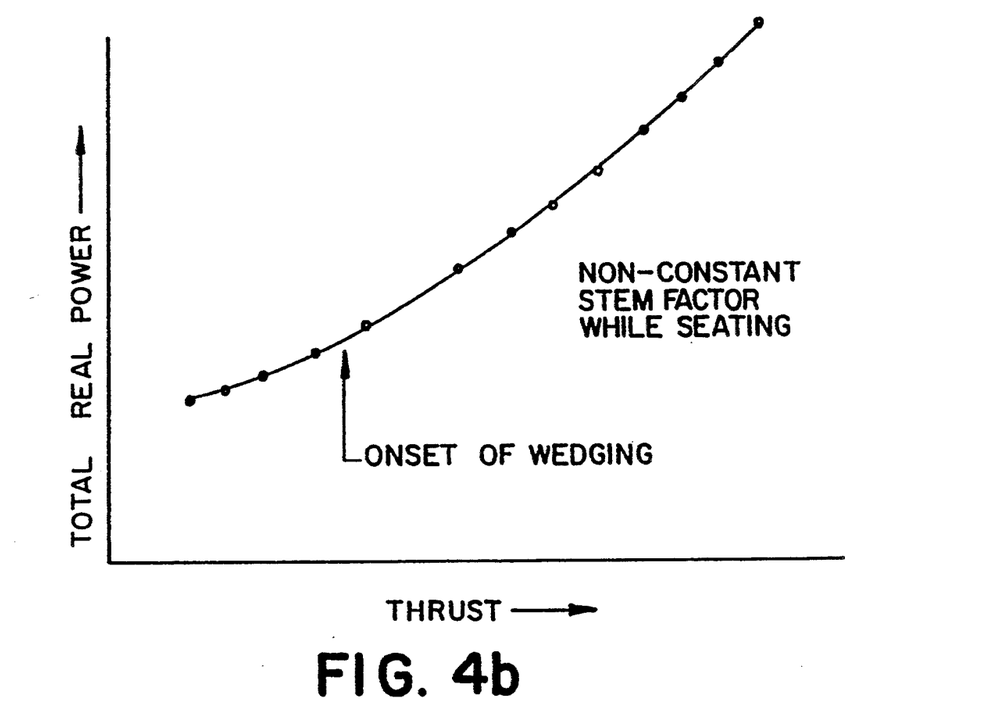

However, for the other half of the population of motor operated valves installed in nuclear power plants for which a graph of thrust vs real motor power does not form a straight line but instead forms a curved line as in FIG. 4b, the procedure described in parent patent application Ser. No. 08/161,833 cannot be used. For such valves, the stem factor, or torque to thrust ratio, does not remain constant, but instead, tends to increase as the valve closes. This fairly common condition is thought to be the result of imperfect thread mating surfaces between the stem and the stemnut which may cause some degree of metal to metal contact during seating as lubricant is squeezed thinner between mating threads, thereby resulting in a worsening friction condition.

For valves in which there is a non-constant stem factor during seating, the total real power displays an increasing rate (increasing watts/msec) after the onset of wedging. However, the rate of thrust buildup during the same time is still as constant as it would have been in a constant stem factor situation. The combination of a constant thrust rate and a non-constant total real power rate means that it is no longer possible to divide the thrust rate (old or new) by the new power rate, both after the onset of wedging, to obtain a constant thrust to power ratio that is valid above or below the onset of wedging.

The present invention solves the remote thrust determination problem both before and after the onset of wedging for all motor operated valves, not just those having a constant stem factor during seating. Several insights have contributed to the invention. The first is that even with lubrication degradation, and with a non-constant stem factor during seating, any new thrust trace should still build up thrust at the same constant rate from the onset of wedging until motor cutoff.

The reason why the stem thrust builds up at a constant rate after the onset of wedging regardless of the state of the stem to stemnut lubrication is believed to be due to the fact that once the stem 24, disk 18, and seat 20 are in a mechanical stackup, (as is the case at the onset of wedging), and if the motor speed is not seriously reduced, (and this is true for A.C. motor operated valve induction motors), and if the spring pack 32 displacement is much smaller than the corresponding circumferential displacement of the worm gear 31, (and this is typically true), then the rate of thrust buildup is primarily determined by the combined compliances (or inversely the combined stiffnesses) of the total mechanical structure (including the thrust-returning structure such as the yoke and yoke connection flanges), and this tends to be invariant. It's as if the stem is being pushed into a brick wall.

A non-constant stem factor does not alter the constancy of the thrust buildup rate after the onset of wedging. The non-constant stem factor can be thought of as increasing the stem to stemnut friction during a given valve seating, as opposed to increasing the stem to stemnut friction between valve seatings as is the case for lubrication degradation. In either case, the resulting affect is increased stem to stemnut friction. Since the increased friction does not alter the thrust rate in the latter case between one seating and another as discussed above, it should also not alter the thrust rate within a given seating.

Addressing still another situation, the onset of wedging is not necessarily the immediate brick wall for some valves that it is for others. Some valves need several milliseconds for their mechanical stackup parts to align themselves to each other before they behave like a solid stackup. These valves are said to exhibit "soft wedging" For soft wedging valves, the rate of thrust buildup is slow at first, not reaching its constant rate until several milliseconds after the onset of wedging. The way that a particular soft wedging valve aligns its mechanical stackup parts must be fairly consistent, because the nature of the soft wedging condition for a particular valve (the exact way it starts to build up thrust at the onset of wedging) seems to be consistent.

The associated important insight is that for soft wedging valves, though the valve develops thrust more slowly following the onset of wedging, it does so in a very repeatable way.

Therefore, despite possible unknown lubrication degradation, a possible non-constant stem factor during seating, and a possible soft wedging condition, any prior thrust trace should still be fairly representative of a new thrust trace in the way that the thrust builds up after the onset of wedging. This is not to say that the value of the thrust at the onset of wedging has to be the same as before, only that the change in thrust as a function of time from the onset of wedging is fairly similar to what it was before. Notice that this less restrictive condition even allows for a possible unknown change in packing force. Since only the power trace will be obtained at the remote location, an old thrust trace obtained in a previous at-the-valve test must be combined with the new power trace to yield a remote thrust approximation. Both the old thrust trace and the new power trace must have been obtained for the case of zero differential pressure, and the traces must be aligned with each other at the time corresponding to the onset of wedging for each. The methodology of the present invention does not result in the potentially erroneous result that the thrust at the onset of wedging in the new case is the same as it was in the old thrust case even though the new power trace and the old thrust trace are aligned at the onset of wedging. Clearly then, the present invention is not just a point to point mapping between the old thrust trace and the new total real power trace.

Figure 5:
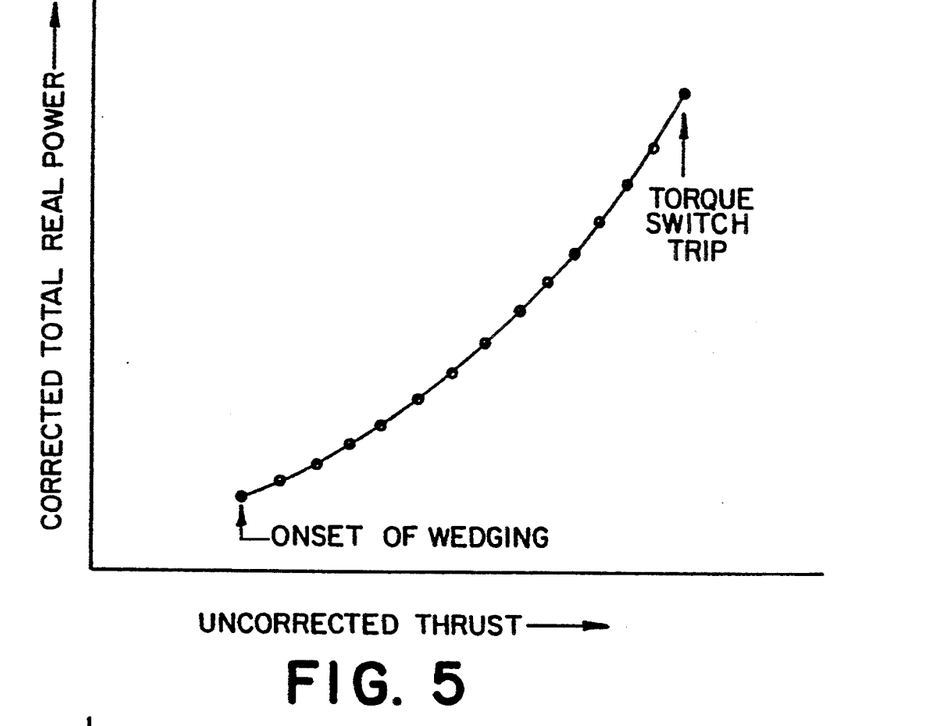
FIG. 5 is a graphical illustration of corrected total real power vs uncorrected thrust.

The two traces are marked with cursors at the respective onset of wedging points so they can be aligned in the time domain as indicated above. The total real power trace is also marked at the torque switch trip point, and at the zero thrust point identifiable as the tension to compression transition near the beginning of the stemnut rotation as the valve starts to seat. Both traces are then filtered to remove any unrelated high frequency content. This is especially necessary for the total real power trace because it typically contains significant oscillations at the worm gear tooth mesh frequency after the onset of wedging, and such oscillations are not reflected in the thrust trace, even in a corresponding thrust trace. The filtering can be achieved by any known means or method, including least squares polynomial approximation, which can capture the essential contour (shape or skeleton) of the trace. Then the two traces are effectively cross plotted against each other for the points between the onset of wedging point, and the torque switch trip point of the power trace as in FIG. 5. Prior to cross plotting, all the uncorrected power values are corrected by subtracting the value of the total real power at zero thrust from them.

$$P_{CORR} = P_{UNCORR} - P_{THR=0}$$

Note that the thrust values in the resulting cross plot at this stage are not corrected.

When combining the total real power trace with the prior thrust trace, it should be expected that since the traces were obtained at different times, the time from the onset of wedging to torque switch trip might be different for the two traces. It is the more common situation that when such a difference exists, the time from the onset of wedging to torque switch trip is less for the (new) total real power trace than for the prior thrust trace. This is because lubrication degradation is more likely than lubrication improvement, and lubrication degradation acts to reduce the above time interval from the onset of wedging to torque switch trip. In this situation, there is no problem in combining data points all the way to the torque switch trip point of the (new) power trace, as a thrust point will exist in the prior thrust trace for each power trace point.

However, if the opposite situation should occur, and this might occur if the torque switch setting was increased after acquisition of the prior thrust trace, then the following procedure is followed. The prior thrust trace is analyzed to determine the thrust rate (lbs/msec) for the region just prior to the torque switch trip point, and additional points are added (replacing any existing points) extending the thrust rate beyond the existing torque switch trip point to the torque switch trip point of the power trace. Then the modified thrust trace is combined with the power trace as before.

In order to be able to determine the corrected thrust values, it is necessary to first curve fit the corrected power vs uncorrected thrust curve with an analytical function that describes the uncorrected thrust to total real power relationship. The data to be curve fit is normally limited to the region from the onset of wedging to torque switch trip, but in no case should it extend beyond motor current cutoff. In selecting the appropriate analytical function, a quadratic function has been found to work well. The curve fit process is one of determining the coefficient values for the best fit quadratic function through the cross plotted data points from the onset of wedging to torque switch trip. The form of the quadratic function is:

$$P_{CORR} = aT_{UNCORR}^2 + bT_{UNCORR} + c$$

Initially the thrust data values are uncorrected. Specifically the uncorrected value of the thrust at the onset of wedging is what it was in the prior thrust test. Obviously, to not correct the thrust values would be to not allow for packing force changes. When the thrust values are corrected as indicated, a possible (unknown) packing force change is taken into account, and improved accuracies result for all force values to be approximated remotely from the power trace. The following method is used to arrive at the corrected thrust values.

First determine the coefficients in the above quadratic equation. Note that the "c" value in the above equation is the residual corrected power at the zero thrust point in the subsequent (new) trace. Recall though that the corrected power is supposed to be zero at the zero thrust point, i.e., no residual. To accomplish this, divide the "c" value in watts by the slope of the above equation (watts/lb) evaluated at the onset of wedging point to get the thrust correction. If the residual corrected power was positive, increase all the uncorrected thrust values by the positive thrust correction value to get the corrected thrust values. The following linear approximation may be used for the correction:

$$T_{CORR} = T_{UNCORR} + \frac{(c)}{\left(\frac{\Delta P_{CORR}}{\Delta T_{UNCORR}}\right)_{WEDGING}}$$

The correction can be determined even more accurately directly from the quadratic function relating corrected power and uncorrected thrust:

$$T_{CORR} = T_{UNCORR} + \frac{-b + \sqrt{b^2 - 4ac}}{2a}$$

When all the uncorrected thrust values are replaced with corrected thrust values in the quadratic function, and the coefficients are re-evaluated, the "c" value will be close to zero resulting in the formula:

$$P_{CORR} = aT_{CORR}^2 + bT_{CORR}$$

Absolute thrust values can now be approximated using the totally corrected quadratic function at any corrected total real power value on the power trace, in the region below the onset of wedging as well as above the onset of wedging.

The above quadratic function was determined while the valve 10 was seating and the stemnut was turning in a direction that would cause it to apply thrust, as opposed to turning in a direction that would cause it to reduce thrust. The stem factors are different for these two cases, so it would not be valid to attempt to approximate thrust values at those few places on a trace where the stemnut is known to be turning in a direction that would cause it to reduce thrust. These few places are when the compressive stem thrust is being reduced at the start of the opening stroke, and when the residual tensile packing force is being reduced at the start of the closing stoke.

The stemnut is turning in the proper direction, that is the direction that would cause the thrust to increase, when the valve disk 18 is being pulled out of a seat 20 during the opening stroke and when after the disk 18 is pulled free, the stem 24 moves through the packing as the valve continues to open. Thus the above quadratic function is valid at these locations, but some reduced accuracy may result because different thread mating surfaces are involved.

point by point approximated thrust values (scaled in lbs) obtained by evaluating the power trace through the quadratic function can be displayed from zero thrust to torque switch trip and can serve as an equivalent thrust trace.

The remote thrust approximation methodology of the present invention should be used primarily for zero differential pressure applications because the onset of wedging point is mechanically similar. Except when a prior differential pressure test (at similar differential pressure) is available to provide the prior thrust trace, this methodology should be used cautiously for differential pressure tests because the results may be less accurate in approximating absolute thrust values.

Under differential pressure conditions, some valves tend to have the torque switches trip at a lower thrust value than under zero differential pressure conditions. Such valves are said to exhibit a sensitivity to rate-of-loading (ROL).

Some valves may have a rate-of-loading problem of up to more than 30% thrust reduction, while other valves may have no thrust reduction problem as a result of ROL.

Since it is so difficult to test a valve in the required differential pressure condition, it is important to be able to approximate remotely not only the thrust at torque switch trip in a zero differential pressure test as above, but also to be able to bound the ROL reduction in thrust at torque switch trip that could occur with the particular valve in a differential pressure condition, and to be able to do so in the same remote zero differential pressure test. This exact capability is also part of the present invention, and is provided from the same information already gathered and used in the previously discussed methodology for remotely approximating the thrust.

The insight here is to see that the valves that exhibit a sensitivity to rate-of-loading are the same valves that exhibit non-constant stem factors while seating. In the differential pressure condition, the thrust builds up slowly as the differential pressure forces the closing disk 18 against the downstream seat 20a. This effectively gives a non-constant stem factor valve more time to be building up thrust at the higher stem factor values. Thus, such a valve will have achieved less total thrust change for about the same amount of total torque change, than it would have achieved in a zero differential pressure condition where the more rapid thrust buildup causes the average stem factor to be lower.

Figure 6:
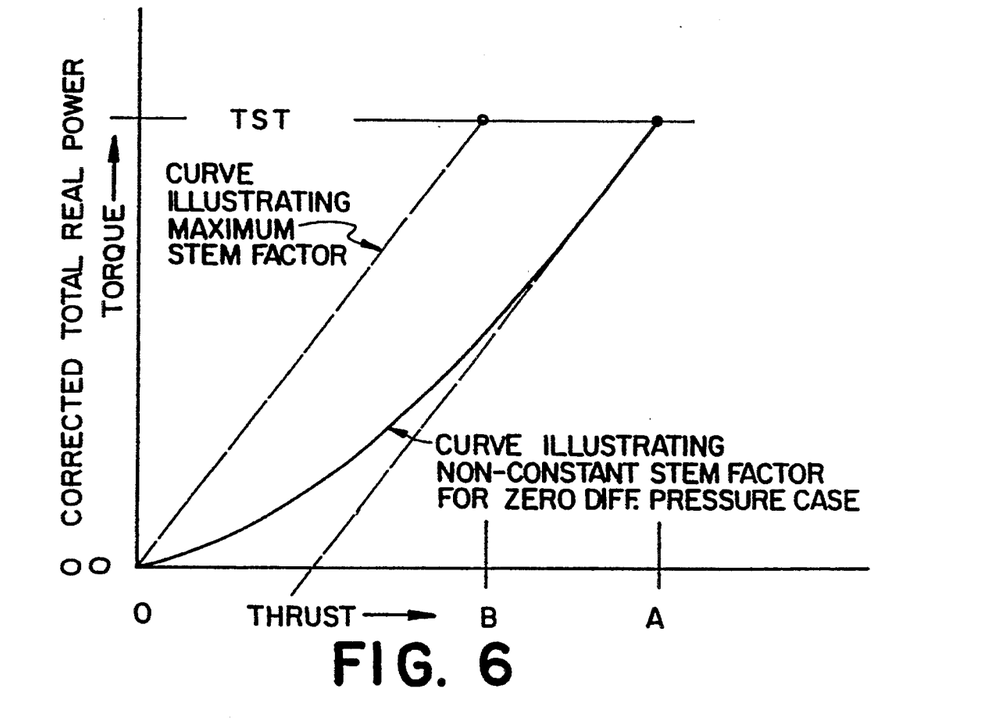
FIG. 6 is a graphic illustration showing torque and real power vs thrust and torque trip switch with both maximum stem factor and at non-constant stem factor.

FIG. 6 illustrates this situation. Torque and total real power are plotted on the ordinate, with the origin corresponding to zero torque and corrected total real power, respectively. Thrust is plotted on the abscissa, with zero thrust shown at the origin. The curved line is representative of both torque vs thrust, and total real power vs thrust, in the zero differential pressure condition. Point A, the thrust value where the curved line crosses the line indicating torque switch trip torque, is the thrust at torque switch trip in the zero differential pressure test. The dotted line, which corresponds to the maximum stem factor, is shown shifted to the origin to represent the worst case ROL in a differential pressure condition, that is maximum stem factor existing for the entire time while closing. Thus point B, the thrust value where the shifted dotted line crosses the line indicating torque switch trip torque, is the worst case (most reduced) thrust possible in a differential pressure condition. Thus the worst case ROL reduction percentage or percent ROL bound is determined by:

$$\left(\frac{A-B}{A}\right) \times 100\%$$

The percent ROL bound is determined from the previously described quadratic function relating corrected power and corrected thrust, and derived from the prior thrust and subsequent power traces. All values are from zero differential pressure tests.

The B thrust is computed by dividing the corrected power at torque switch trip by the maximum slope ($\Delta$ power/$\Delta$ thrust) evaluated near the torque switch trip point. The A thrust is the previously approximated thrust at torque switch trip.

It should be obvious that a valve having a fairly constant stem factor would exhibit a very small (if any) percent ROL bound, so that such a valve would be expected to not suffer any reduction in the thrust at torque switch trip in the differential pressure condition.

To reiterate, as described in the present invention, a methodology has been disclosed, applicable to all motor operated valves having AC motors, that makes it possible, in a zero differential pressure test, to approximate remotely from the motor control center, absolute thrust values including the thrust at torque switch trip (TST), and at the same time determine the percent rate-of-loading bound indicating the maximum percentage by which the approximated thrust at TST in the zero differential pressure test might be reduced in a differential pressure condition for that particular valve.

The ability to be able to determine the percent ROL bound in a zero differential pressure test is invaluable for nuclear power plants because of the extreme difficulty of conducting a differential pressure test on a safety related valve that encompasses the differential pressures that might be encountered in the worst case (accident) condition. The very undesirable alternative has often been to assume the worst possible case (more than 30% thrust reduction) for all motor operated valves that can't be tested under full differential pressure conditions, and set the torque switch higher (if possible) to accommodate this perceived reduction (real or not real). With the present invention, valves needing only a 5% or 10% accommodation are identified and adjusted accordingly, while only the valves requiring the 30% accommodation need receive it.

The following discussion will serve to review the present invention in the light of the current state of the art, and demonstrate why it represents a significant improvement over the current state of the art.

U.S. Pat. No. 4,987,358 (Branam) disclosed an electronic torque switch that makes use of the approximate relationship between torque and electric motor power to replace the mechanical torque switch. Two modes of operation are presented. In one mode, the power level mode, the idea is to open the control switch which stops the motor on the basis of a predetermined reference power level which has been related to a predetermined torque level. Lubrication degradation might not significantly change the torque level at the trip point, but it would change the thrust level because of the resulting change in stem factor. Mechanical torque switches are also unreliable controllers of thrust for the same reason.

In the second mode of operation, the rate of change of power mode, control switch schemes that identify the onset of wedging from the rate of change of the power signal allow continued motor operation a set amount of time before tripping the control switch, the set amount of time being related to the previously determined rate of thrust buildup and the desired sealing thrust (or thrust margin). These schemes are just thrust margins, not absolute thrust values, and may not work well on all valves, such as soft wedging valves.

Parent patent application Ser. No. 08/071,421 demonstrated that the rate of thrust buildup after the onset of wedging is substantially unaffected by lubrication degradation, so that even in the event of significant lubrication degradation, a previously determined thrust rate would still hold. Thus, even with unknown lubrication degradation, the rate times the time after the onset of wedging can be used to remotely approximate the thrust margin. It was also shown that the increase in the power rate compared a previous power rate, both measured after the onset of wedging, can be used to remotely quantify the increase in stem factor. Soft wedging valves can be a problem here too.

Parent patent application Ser. No. 08/161,833 pointed out that for a given lubrication condition, the relationship between thrust change and power change tends to be constant both before and after the onset of wedging, and that this relationship between thrust change and power change could be determined by ratioing a previous thrust rate with a subsequent power rate, both measured after the onset of wedging. It was also shown that the effects of lubrication degradation are automatically accounted for by the new power rate measurement. This made possible for the first time, absolute remote thrust approximations by extending the ability to infer thrust values to beyond the onset of wedging all the way to zero thrust. But as pointed out above, a constant relationship between thrust change and power change simply does not exist for those valves that have a non-constant stem factor while seating (even if the lubrication condition is constant). Thus the methodology described in the referenced parent application only holds for valves exhibiting constant stem factors while seating.

The present invention, which is intended especially B for zero differential pressure tests, overcomes all of the above limitations. It does so by combining the actual prior thrust trace with the actual subsequent power trace, time point by time point, the traces being aligned properly at the onset of wedging point, so that if a non-constant stem factor exists while seating, or if soft wedging exists, or if lubrication degradation occurs, the nature of these conditions is discerned by the methodology and is taken into account. The methodology is not just a simple mapping of an old thrust trace properly aligned with a new power trace. It involves special corrective processes of both traces that accommodate in addition the possibility of an unknown change in packing force. The present invention is applicable to all A.C. motor operated valves for which there exists a prior thrust trace. When the valve is actuated, a new real power trace is acquired remotely, preferably at the motor control center, and used in conjunction with the prior thrust trace to approximate absolute thrust values. The thrust approximating accuracy is about ±15%. This accuracy holds regardless of any change in lubrication condition, regardless of any soft wedging condition of the valve assuming the onset of wedging point is still identifiable, regardless of a change in packing force, and regardless of whether the valve exhibits a constant or non-constant stem factor while seating.

In addition the methodology of the present invention identifies remotely the percent rate-of-loading bound for the particular valve. This previously undeterminable value from just a zero differential pressure test gives the maximum percentage reduction in the thrust at torque switch trip that could occur under differential pressure conditions for the valve. Just to be able to do this from a zero differential pressure test would be valuable enough. To be able to do it remotely, for example, from the motor control center, makes it even more valuable.

From the foregoing description, it can be seen that the present invention comprises a method for approximating the stem thrust during the operation of a motor operated valve combination. It will be appreciated by those skilled in the art that changes could be made to the embodiment described above without departing from the broad inventive concepts thereof. It is understood, therefore, that this invention is not limited to the particular embodiment disclosed but it is intended to cover all modifications which are within the scope and spirit of the invention as described by the appended claims.

We claim:

1. A method for approximating the stem thrust during the operation of a motor operated valve combination including a valve having a valve stem, a valve disk, a valve seat, and a motor operator having a motor drive means interconnecting the motor to the valve stem for movement of the valve disk toward and into engagement with the valve seat to close the valve and a control switch for deactivating the motor, the method comprising the steps of:

(a) sensing the stem thrust of the motor operated valve combination as a function of time during valve closing at a first time and establishing a thrust trace;

(b) sensing the real electrical power of the motor as a function of time during valve closing at a second time which is subsequent to the first time and establishing a power trace;

(c) relating corresponding time points of the thrust trace and the power trace starting at a point on each trace corresponding to the onset of wedging of the valve disk and extending to a point of the power trace at which the control switch deactivates the motor;

(d) determining from the power trace the value of the power at the zero thrust point;

(e) determining a best fit analytical function that takes into account the zero thrust power point and the change in thrust vs change in power relationship described by the corresponding time points of the two traces from the onset of wedging to deactivation of the motor by the control switch; and (f) approximating from the best fit analytical function, a thrust value associated with a point on the power trace at the second time.

2. The method as recited in claim 1 wherein the control contact switch is a torque switch and the approximated stem thrust value at the second time is the thrust at which the torque switch trips.

3. The method as recited in claim 2 further comprising the steps of:

(g) determining from the best fit analytical function the change in power to change in thrust slope in the region just before the point at which the control switch deactivates the motor;

(h) dividing the change in power from the zero thrust point to the point at which the control switch deactivates the motor by the determined slope to approximate the maximally reduced thrust at the point at which the control switch deactivates the motor due to rate-of-loading; and (i) indicating the percent rate-of-loading bound as the difference between the unreduced thrust at the point at which the control switch deactivates the motor and the maximally reduced thrust at the point at which the control switch deactivates the motor, the difference divided by the unreduced thrust and multiplied by 100 for bounding the maximum percentage reduction in the approximated thrust valve at the point at which the control switch deactivates the motor for potential condition of closure of the valve under differential pressure.

4. The method as recited in claim 1 wherein motor is a three phase motor and the real electrical power is the total real power of all three electrical phases.

5. The method as recited in claim 1 wherein the analytical function is a quadratic function.

6. The method as recited in claim 1 wherein the thrust trace is extended beyond the point at which the control switch deactivates the motor at the same rate of thrust increase that existed just before the point at which the control switch deactivates the motor.

7. The method as recited in claim 1 wherein the thrust values are approximated for a series of consecutive time points on the power trace between zero thrust and the point at which the control switch deactivates the motor further comprising the step of displaying consecutive time points to form an equivalent thrust trace.

* * * * *